United States Patent
Brudis et al.

(10) Patent No.: US 6,523,409 B2
(45) Date of Patent: Feb. 25, 2003

(54) ROADWAY CURVE ADVISORY SPEED DETERMINATION

(75) Inventors: Tony Brudis, Ellicott City, MD (US); Seward Cross, Upper Marlboro, MD (US); Robert Milstead, Randallstown, MD (US); Nguyen Ha, Herndon, VA (US)

(73) Assignee: Brudis & Associates, Inc., Columbia, MD (US)

( * ) Notice: Subject to any disclaimer, the term of this patent is extended or adjusted under 35 U.S.C. 154(b) by 0 days.

(21) Appl. No.: 09/877,891

(22) Filed: Jun. 8, 2001

(65) Prior Publication Data

US 2003/0005765 A1 Jan. 9, 2003

(51) Int. Cl.$^7$ .............................................. G01P 15/00
(52) U.S. Cl. ....................................................... 73/488
(58) Field of Search ........................ 73/488, 489, 491, 73/492, 493, 495; 340/440, 669, 686, 689; 701/70

(56) References Cited

U.S. PATENT DOCUMENTS

| | | |
|---|---|---|
| 2,831,266 A | 4/1958 | Dorn et al. |
| 4,357,594 A | 11/1982 | Ehrlich et al. |
| 5,208,754 A | 5/1993 | Nakaura et al. |
| 5,343,411 A | 8/1994 | Olsson |
| 5,617,086 A | 4/1997 | Klashinsky et al. |
| 5,992,032 A | 11/1999 | Chiang et al. |
| 6,121,873 A | 9/2000 | Yamada et al. |

OTHER PUBLICATIONS

Aashto, A Policy on Geometric Design of Highways and Streets, 2001, American Association of State Highway and Transportation Officials, Washington D.C. 2001.

Brudis and Associates, Inc. Advisory Speeds on Maryland Roads, Hanover, Maryland. Report submitted to Maryland Department of Transportation, Office of Traffic and Safety, Aug. 1999.

*Primary Examiner*—Richard A. Moller
(74) *Attorney, Agent, or Firm*—William S. Ramsey

(57) ABSTRACT

The advisory speed meter is used to determine the advisory speed for a highway curve or to provide data for use in determining the advisory speed for a highway curve. The meter determines and records the maximum lateral horizontal acceleration experienced by a vehicle and occupants while traversing a highway curve. The meter has been extensively tested on rural curves and on entrance and exit and connecting ramps between all types of highways. The process for determining an advisory speed for a curve is described. The advisory speed meter provides accurate, reproducible data for use in determining advisory speeds for highway curves.

7 Claims, 2 Drawing Sheets

ROADWAY CURVE ADVISORY SPEED DETERMINATION

FEDERALLY SPONSORED RESEARCH

Not Applicable.

SEQUENCE LISTING OR PROGRAM

Not Applicable.

BACKGROUND

1. Field of Invention

This invention relates to apparatus and method for assistance in determining the safe advisory speed for roadways.

2. Prior Art

The safe and comfortable speed for traverse of a curve in a highway often is indicated by a sign mounted at the beginning of the curve which states the advisory speed for traverse of the curve. Such curves commonly are encountered as curves in two-lane roadways and on interconnecting ramps between roadways. Advisory speeds are dependent on roadway conditions, sight distance, intersections and driveways, accident history, and on the lateral horizontal acceleration experienced by the vehicle and occupants. Advisory speeds currently are determined using a ball-bank indicator or an electronic inclinometer, both of which indicate the lean or tilt of a vehicle while traversing the curve, and which are surrogates for lateral horizontal acceleration. Unfortunately, the measurement of lean or tilt is plagued with variables of the type of vehicle, in particular, in the suspension system and wheel base width. The invention of this application is an automatic device which determines and records the maximum lateral horizontal acceleration experienced by a vehicle and occupants traversing a curve. Acceleration data derived using the apparatus and methods of this invention are used to help determine the advisory speed for curves.

Elements which may affect the advisory speed for a curve include pavement conditions, operating speeds, vehicle suspension systems, roadway gradients, surface friction factors, vehicle classifications, vehicle occupancy and highway gravitational forces and human factors.

U.S. Pat. No. 2,831,266 discloses a tilt indicating apparatus in which an illuminated ball which moves in an arcuate tube indicates the amount of tilt of the apparatus.

U.S. Pat. No. 5,343,411 discloses an accelerometer built into a vehicle in which the acceleration or deceleration is integrated or differentiated and the result compared with a reference signal. If the observed signal exceeds a reference signal, an airbag is activated. This allows activation of the airbag only when a significant event occurs.

U.S. Pat. No. 4,357,594 discloses a vehicular hazard warning system which is responsive to, among other signals, abrupt deceleration. A microprocessor is used to relate the rate of deceleration with the blinking of warning lights.

U.S. Pat. No. 5,208,754 discloses a device for calculating estimated vehicle acceleration and speed. Vehicle speed is determined by two methods, from the wheel speed, and from acceleration as measured by an accelerometer. When, during acceleration, there is wheel slippage the accelerometer measurements are used in determining vehicle speed. At other times the vehicle speed is determined from wheel speed.

U.S. Pat. No. 5,617,086 discloses a traffic monitoring system which, among other things, monitors the passage of vehicles entering a curve and, using a microprocessor, calculates the safe speed for negotiating the curve, and indicates the safe speed on a sign. Inputs concerning the vehicles include vehicle height and weight. Sensors in the pavement detect the passage and speed of the vehicle.

U.S. Pat. No. 5,992,032 discloses a computer based inclinometer which uses the piezoelectric effect to measure the inclination of a plane with respect to a reference plane.

U.S. Pat. No. 6,121,873 discloses a device for measuring lateral acceleration rate of a vehicle body, among other things. The vehicle has sensors for the detection of the turn rate, an acceleration applied in a horizontal direction traverse to a longitudinal axis of the body, called the "traverse acceleration sensor", and the vehicle speed. Data from these sensors are used to determine the vehicle speed, yaw rate, lateral acceleration and roll rate. The lateral acceleration of the vehicle body at the yaw sensor is calculated as the product of yaw rate and vehicle speed. The turn rate sensor is mounted at the center of gravity and the lateral acceleration sensor is mounted above the yaw rate sensor. The data derived from these two sensors are used to calculate the roll rate. The output is the vehicle speed, yaw rate, lateral acceleration at the center of gravity, and the roll rate.

In a second embodiment, two traverse acceleration sensors located at the upper front and lower rear of the vehicle are used in the determination of yaw rate without using a sensor for the detection of the turn rate. Sensors for the vehicle speed, turn rate, and transverse acceleration are used in determination of the vehicle speed, yaw rate, traverse acceleration at the center of gravity, and roll rate. There is no recording of the maximum lateral horizontal acceleration.

The prior art systems do not disclose the characteristics of the present invention, that of determining and recording the maximum traverse acceleration during a discrete period of measurement. Furthermore, method of application of determined maximum traverse acceleration as one parameter in a determination of the safe advisory speed for a curve of the present invention.

OBJECTS AND ADVANTAGES

The objective of the advisory speed meter of the present invention is to provide an apparatus for accurate, reproducible determination of maximum lateral horizontal acceleration in a vehicle for assistance in determining the safe advisory speed for a curve in a road way.

Another objective of the advisory speed meter of the present invention is to provide an apparatus for recording the maximum lateral horizontal acceleration experienced in a vehicle traversing a curve in a roadway.

Another objective of the advisory speed meter of the present invention is to provide an objective, reliable, reproducible, accurate method for determining the maximum lateral horizontal acceleration experienced in a vehicle traversing a curve in a roadway for use in determining the safe advisory speed for traversing the curve.

Another objective of the advisory speed meter of the present invention is to provide an apparatus for recording the maximum lateral horizontal acceleration experienced in a vehicle traversing a curve in a roadway which is inexpensive, easy to use, and may be manufactured and used without adverse effect on the environment.

SUMMARY

The advisory speed meter is a meter for determining the maximum lateral horizontal acceleration experienced by the occupants of a vehicle and comprises an accelerometer unit capable of sensing the lateral horizontal acceleration experienced in a vehicle, the accelerometer unit mounted on the floor of the vehicle at the vehicle centerline, the front of the accelerometer unit oriented toward the front of the vehicle, the accelerometer unit mounted perpendicular to the vehicle floor, and a meter unit capable of calculating and displaying the maximum lateral horizontal acceleration experienced by a vehicle, the accelerometer unit connected by a connector to the meter unit.

The process for determining the advisory speed for a curve in a roadway comprises the steps of traversing the curve in a vehicle of specified type at a specified constant speed, measuring the maximum lateral horizontal acceleration experienced by the vehicle while traversing the curve using a vehicle accelerometer, repeating the traversing curve and measuring the maximum lateral horizontal acceleration steps at various speeds, determining the speed of traverse associated with a predetermined maximum lateral horizontal acceleration, and designating the speed of traverse associated with a predetermined maximum lateral horizontal acceleration as the advisory speed for the curve in the roadway.

DRAWINGS

DETAILED DESCRIPTION

Figure 1:
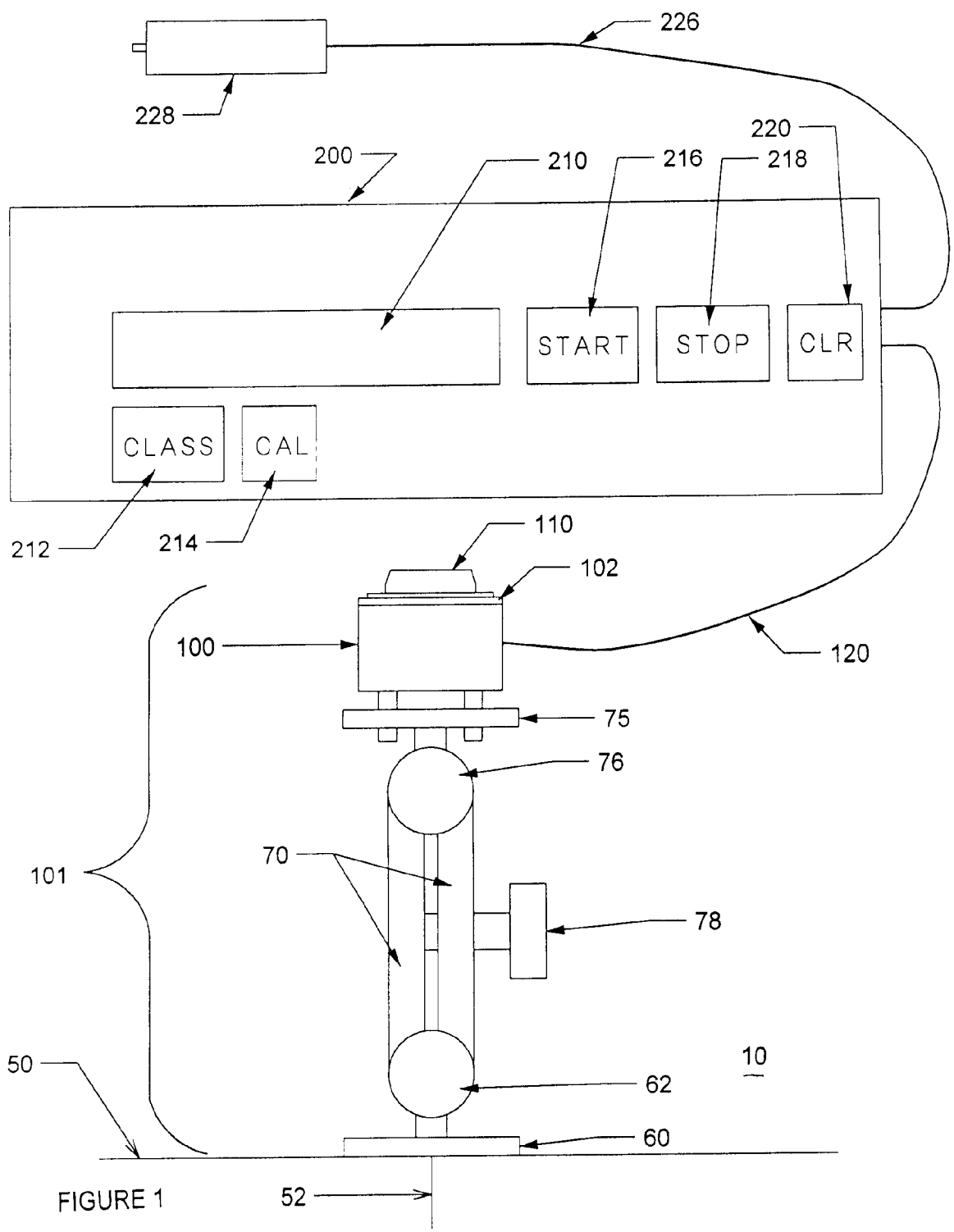
FIG. 1 is a diagrammatic view of the advisory speed meter.

FIG. 1 is a diagrammatic view of the advisory speed meter 10 of the present invention. The accelerometer unit 101 is attached to the floor 50 of the vehicle used in determining the safe advisory speed for a road curve.

A disk shaped mounting bracket 60 is attached by three sheet metal screws into the floor 50 of a vehicle at the midline 52 of the length of the vehicle. A spot between seat compartments should be selected to minimize accidental disturbance by the driver or passenger. A ball 62 is attached to the center of the mounting bracket 60. The ball 62 fits into pedestal 70 which consists of two sections of a laterally split tube which are retained and drawn together by a tightening screw 78. An accelerometer mounting bracket 75 is attached to the bottom of the accelerometer casing 100. A ball 76 is attached to the bottom of the accelerometer mounting bracket 75. The ball 76 fits into the cavity in the pedestal 70. The screw 78 is used to fix the pedestal at the desired position with respect to the mounting bracket 60 and the accelerometer mounting bracket 75. A leveler 110 is located at the top 102 (FIG. 2) of the accelerometer casing 100.

Figure 2:
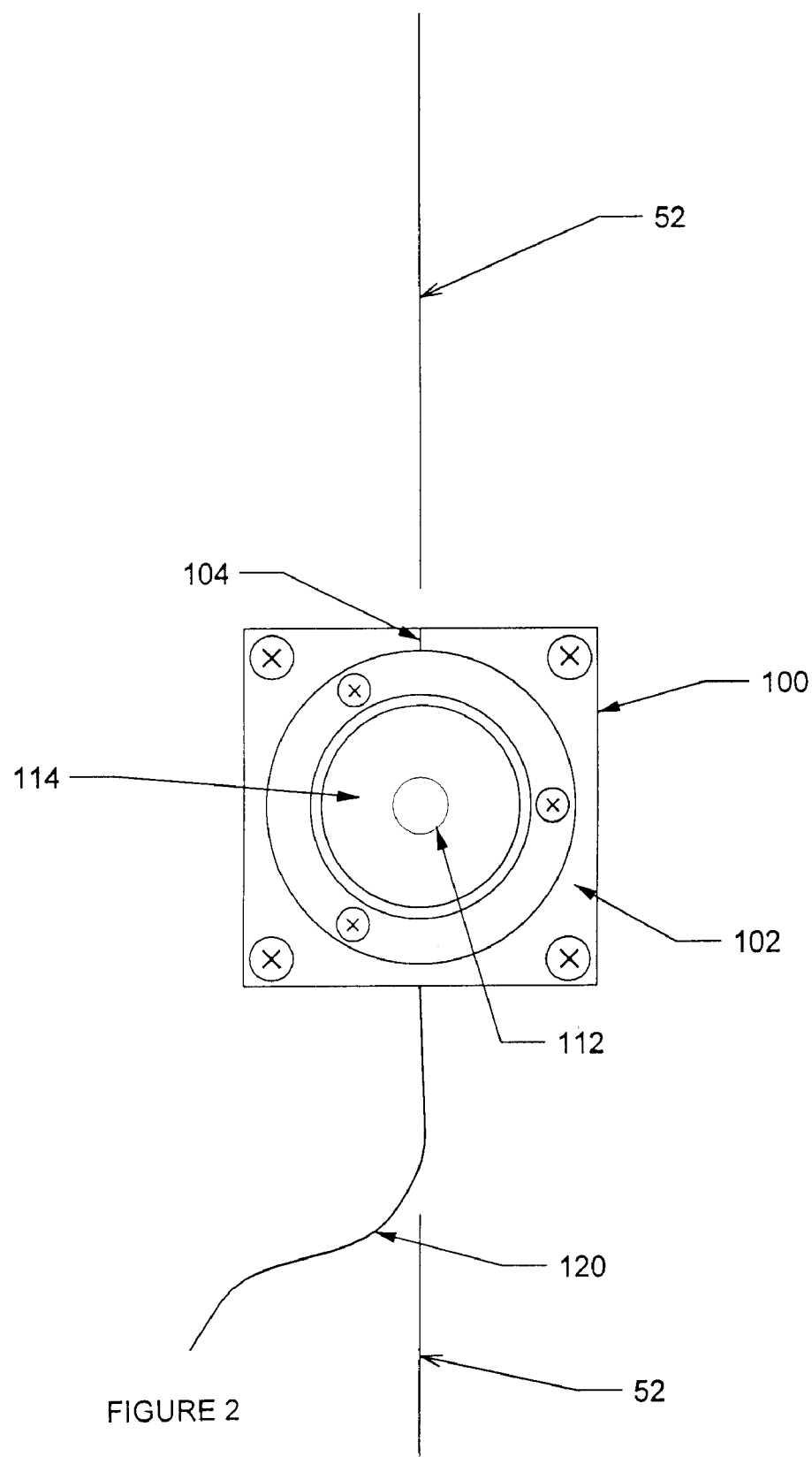
FIG. 2 is a diagrammatic view of the top of the accelerometer

FIG. 2 shows the top 102 of the accelerometer casing 100. The leveler 110 is filled with a fluid which is visible through a transparent faceplate 114 with a bulls eye 112 in the center of the faceplate. To level the accelerometer, a bubble in the leveler is centered in the bulls eye 112. A front indicator 104 is on the top of the accelerometer on the front side and is aligned with the front and center axis 52 of the vehicle on which the accelerometer is mounted.

A power cable connector 226 provides power to the advisory speed meter and has a plug 228 which plugs into the 12 volt adapter (cigarette lighter) in the vehicle.

The accelerometer unit 101 is attached by a wire or cable connector 120 to the meter display 200. The meter display 200 is in a rectangular container which may be mounted in any convenient place visible to the vehicle driver, such as the dashboard, by a temporary mounting, such as strips of hook and loop material.

Visible on the front of the meter display 200 is the readout 210 and a series of function keys 212–220. The function keys include CAL 214, used to calibrate the meter after the accelerometer is aligned and locked; CLASS 212, used to select the vehicle class; START 216, depressed when entering the curve test run; STOP 218, depressed after exiting the curve; and CLR 220, depressed between runs to return settings to the zero calibration.

A preferred accelerometer is the ADXL202 model 2-axis accelerometer available from Analog Devices, Norwood, Massachusetts. This accelerometer provides complete dual axis acceleration measurement systems on a single monolithic IC. The technology incorporated a polysilicon surface-micromachined sensor and signal conditioning circuitry to implement acceleration measurement in real time. For each axis, an output circuit converts the analog signal to a duty cycle modulated digital signal that can be decoded with a counter/timer port on a microprocessor. The ADXL202 is capable of measuring both positive and negative accelerations to a maximum level of ±2 g.

A preferred microcontroller is a 8051 compatible 8-bit CMOS microcontroller. The internal program/data memory space is implemented using 64K bytes of nonvolatile flash memory. Furthermore, internal data registers and key configuration registers are also nonvolatile. An optional real time clock gives permanently powered timekeeping. The clock keeps time to a hundredth of a second using an on-board crystal. All nonvolatile memory and resources are maintained for over ten years at room temperature in the absence of power.

A preferred display is a standard LCD display with two lines of 16 characters on each line.

Operation

Installation and calibration of the advisory speed meter.

In the preferred embodiment, a compact, standard size, or sports utility vehicle in good working condition is used. The suspension should not have been modified and in good repair. The vehicle must sit level and the tires should be evenly inflated.

The advisory speed meter can be constructed for other vehicle types, such as pick up trucks, vans, stake body, and utility trucks.

The mounting bracket is installed along the centerline of the vehicle between seat compartments to minimize accidental disturbance by the driver or a passenger. The mounting bracket is secured firmly to the floor using self-tapping sheet metal screws. The accelerometer is secured to the pedestal by tightening the bracket about the ball using a set screw. It is important to carefully align the accelerometer along the vehicle centerline with the front on the accelerometer toward the front of the test vehicle. The accelerometer is adjusted so that the leveling bubble located on top is centered within the bulls eye.

The meter display is attached to the dash board by a Velcro or hook and loop fastener at a position convenient for observation by the driver.

The advisory speed meter must be calibrated while the vehicle is on a level site.

The vehicle engine must be off during the calibration procedures. Power to the advisory speed meter must be provided by the 12 volt adapter outlet.

With the engine off, the connector from the accelerometer is attached to the meter display. Next, connect the power cable to the meter display. Finally, plug the power cord into the 12 volt adapter (cigarette lighter).

The meter is now on. The CAL 214 button is pressed and the display will read "calibrating" and then read X=0.000 0.000±0.005. The vehicle class is calibrated by pressing the CLASS 212 button repeatedly which toggles through the three acceptable vehicle classes, COM for compact; MID for mid-size or standard passenger vehicle; and SUV for sport utility vehicle. The meter accepts the last choice which is displayed on the screen.

Power to the meter is disrupted by removing the display meter power cord from the 12 volt adapter. The vehicle engine is now started. Starting the engine while the display meter power cord is connected to the 12 volt adapter may cause a power surge which may damage the display meter.

The meter is now calibrated. Calibration should be performed each day and after any accidental shock to the accelerometer unit 101.

After proceeding to the test site, and after the engine is started, the power cord is plugged into the 12 volt adapter.

The START 216 button is pushed just before entering the curve at its tangent. The display will indicate "logging data". After exiting the curve at its tangent the STOP 218 button is pushed. All data recording will then stop, then the display will show "processing data". Finally, the average maximum lateral gravitation acceleration force (g-force) encountered in the curve will be displayed. The g-force is manually recorded and the meter display is cleared by pushing the CLR 220 button. This action does not remove the accelerometer calibration or vehicle classification settings from memory.

Repeated runs should be made increasing vehicle speed in 5 MPH increments. When the recorded g-force exceeds the recommended limit of 0.28 g-ft/sec$^2$ the series of runs may be completed. A g-force of 0.40 g-ft/sec$^2$ should not be exceeded.

The operator drives the vehicle through the curve at a constant speed based on observation of the speedometer within the vehicle. The vehicle speed during the initial run should be 5 MPH or 10 MPH below the posted advisory limit. The operator should select the path through the curve to reflect the worst condition of the curve, i.e. test runs should be made on the inside curve, or the travel lane with the shortest radius. A uniform path through the curve should be maintained. Sudden jerks should be avoided as they may cause an inaccurate measurement.

The operator should start from a location ahead of the curve site which will allow for acceleration to the test speed before entering the curve. A constant speed must be maintained through the curve. The vertical gradient in the curve will cause vehicle speed to change. The operator should avoid using cruise control as it may fail to accommodate the changes in speed caused by the vertical gradient in the curve.

Multiple runs through the curve at each speed should be made.

Under normal conditions, the suggested Advisory Speed Limit for comfort in a passenger vehicle is when the average maximum lateral gravitation acceleration force (g-force) is 0.28 g-ft/sec$^2$. Other factors play an important role in final posting of an advisory speed. Advisory speeds are dependent on roadway conditions, sight distance, intersections and driveways, accident history, and on the lateral horizontal acceleration experienced by the vehicle and occupants.

A gravitational force (g) or "g-force" is defined as 1 g=32.2 ft/sec$^2$. The term "lateral horizontal acceleration" means the force experience by a vehicle and its occupants when the vehicle is traversing a curve, the force in a horizontal direction directed away from the center of a circle of which the curve is a segment or arc. The lateral horizontal acceleration is commonly experienced by the passengers in a vehicle traversing a curve as the force which urges, pushes, or throws the passenger toward the side of the vehicle which is on the outside of the curve.

Application of gravitational force measurements establishes safe and consistent advisory speeds for highway curves. The system of this invention accurately measures the lateral gravitational force acting upon vehicles and their occupants, whether on an isolated curve, multiple "S" curve, or a ramp to or from a freeway.

Table 1 shows measurements made using the advisory speed meter of this invention, along with other measurements, on rural roads with horizontal curves. Table 2 shows similar measurements made on entrance or exit or connecting ramps between various categories of roadways. The advisory speed meter was used to determine the g-force measurements. Other measurements were made as follows.

A mechanical ball-bank indicator for the determination of advisory speeds in accordance with industry standards was used.

Geometric measurements, such as curve radii; roadway widths and lengths, were used in the calculation of the American Association of State Highway Transportation Officials' (AASHTO) design criteria, termed the AASHTO Design Speed.

An inclinometer, an electronic ball-bank indicator was used to measure the Lean (°) The inclinometer is an analog device which measures the degree of "tilt" or "lean" of a vehicle using a gravity response.

Standard automatic electronic counters, such as traffic counting tubes, which determine operating characteristics of speed, and were used in the development of the "Speed Zone Theory" and "85$^{th}$ percentile speeds", accepted engineering practices in determining roadway speeds. The 85$^{th}$ percentile speed is the speed below which 85% of motorists travel.

A brief discussion of the elements which affect an advisory speed for a curve follows.

Pavement Conditions. Advisory speeds were determined on the basis of dry pavement conditions. The driver has responsibility for evaluating the pavement conditions and suitably adjusting speeds in response to condition changes.

Operating Speed. The operating speed is defined as the highest overall speed at which a driver can travel on a given highway under favorable weather conditions and under prevailing traffic conditions without at any time exceeding the safe speed as determined by the design speed on a section-by section basis. For this study, the determination of an "operating speed" is that which was recorded in the field at the 85$^{th}$ percentile speed.

Vehicle Suspension System. There is some evidence of differences in roll or lean between vehicles of different manufacturers, however, differences attributed to vehicle suspension systems in the test vehicles were found to be minor and were not taken into account in this study.

Roadway Gradient. No account was taken of whether the curves were in an up gradient or down gradient. In addition, the smallest radius curve (inside curve) was the basis for the determination of the advisory speed. The possible differences between the advisory speed in the inside and outside lanes were found to be negligible (approximately 1 MPH).

Surface and Friction Factors. Variations in theoretical coefficients of friction for pavement surfaces were not taken into effect in this study. As recommended by AASHTO, the standard 0.16 friction factor for velocities up to 60 MPH were used to calculate design speeds.

Vehicle Type. Trucks were not included in the analysis of this study, however, trucks were included in the traffic conglomeration and the development of operating speeds.

Vehicle Occupancy. No account of any relationships between vehicle occupancy and vehicle speed were noted.

Gravitational Forces. At normal highway speeds, the lateral horizontal acceleration force which acts on the occupants (gravitational forces or g-force) is the more significant gravitational force which relates to advisory speeds. Longitudinal and vertical driver gravitational forces, while present in a moving automobile, are nominal. Longitudinal and vertical forces were not observed to influence a driver's behavior in a passenger can on a normal highway.

Human Factors. Many human factors which are involved in the motorist decision process were not included in this study. These include such variables as the motorist's reaction time to advisory speed signing, the motorist's threshold levels of safety versus comfort, and the motorist's comfort degree.

TABLE 1

| Curve Number | Advisory Speed (MPH) POSTED | 10° Ball-Bank Speed (MPH) VEHICLE AVG. | 85th Percentile (MPH) RECORDED | AASHTO Design Speed [f = 0.16] (MPH) CALCULATED | Theorectical Coefficient of Friction $[f]_t$ | g-force (Ft/Sec$^2$) AVERAGE | Lean (°) AVERAGE | BAI Comfort Speed (MPH) |
|---|---|---|---|---|---|---|---|---|
| 1 | 25 | 27.0 | 34 | 23 | 0.43 | 0.34 | 21.02 | 35 |
| 2 | 25 | 29.3 | 36 | 28 | 0.29 | 0.34 | 18.61 | 35 |
| 3 | 35 | 39.0 | 41 | 39 | 0.18 | 0.29 | 11.82 | 45 |
| 4 | 35 | 38.0 | 42 | 39 | 0.20 | 0.30 | 12.03 | 45 |
| 5 | 25 | 30.3 | 32 | 33 | 0.14 | 0.22 | 9.67 | 35 |
| 6 | 25 | 25.0 | 32 | 22 | 0.38 | 0.31 | 15.61 | 30 |
| 7 | 40 | 47.0 | 51 | 43 | 0.24 | 0.29 | 16.47 | 50 |
| 8 | 30 | 51.0 | 56 | 48 | 0.23 | 0.24 | 14.76 | 55 |
| 9 | 40 | 43.3 | 48 | 40 | 0.24 | 0.29 | 14.50 | 50 |
| 10 | 40 | 50.0 | 52 | 54 | 0.15 | 0.24 | 11.71 | 50 |
| 11 | 40 | 48.7 | 53 | 45 | 0.24 | 0.22 | 12.21 | 50 |
| 12 | 35 | 37.7 | 42 | 38 | 0.21 | 0.25 | 13.47 | 40 |
| 13 | 30 | 42.7 | 46 | 44 | 0.18 | 0.29 | 14.31 | 40 |
| 14 | 20 | 21.7 | 27 | 20 | 0.32 | 0.29 | 14.37 | 30 |
| 15 | 30 | 39.0 | 47 | 33 | 0.37 | 0.33 | 18.31 | 45 |
| 16 | 35 | 35.7 | 45 | 36 | 0.29 | 0.41 | 22.35 | 45 |
| 17 | 40 | 50.0 | 56 | 51 | 0.20 | 0.20 | 10.81 | 55 |
| 18 | 25 | 31.0 | 38 | 36 | 0.18 | 0.22 | 8.90 | 35 |
| 19 | 30 | 47.0 | 46 | 40 | 0.22 | 0.22 | 10.07 | 50 |
| 20 | 30 | 54.3 | 48 | 55 | 0.09 | 0.23 | 11.08 | 50 |
| 21 | 15 | 16.0 | 18 | 15 | 0.24 | 0.26 | 16.07 | 20 |
| 22 | 25 | 26.7 | 35 | 27 | 0.29 | 0.30 | 18.21 | 30 |
| 23 | 35 | 44.3 | 46 | 45 | 0.17 | 0.28 | 12.61 | 50 |
| 24 | 35 | 39.3 | 42 | 34 | 0.26 | 0.27 | 14.20 | 45 |
| 25 | 15 | 29.0 | 33 | 28 | 0.25 | 0.26 | 14.83 | 30 |
| 26 | 25 | 36.3 | 44 | 36 | 0.26 | 0.33 | 20.20 | 40 |
| 27 | 30 | 37.3 | 42 | 36 | 0.25 | 0.23 | 14.96 | 40 |
| 28 | 35 | 48.7 | 52 | 41 | 0.28 | 0.34 | 16.13 | 50 |
| 29 | 35 | 37.7 | 45 | 37 | 0.27 | 0.30 | 18.10 | 45 |
| 30 | 30 | 38.7 | 38 | 36 | 0.18 | 0.26 | 15.70 | 40 |
| 31 | 40 | 53.3 | 51 | 41 | 0.27 | 0.22 | 13.45 | 50 |
| 32 | 20 | 28.0 | 33 | 30 | 0.20 | 0.36 | 22.26 | 35 |
| 33 | 30 | 31.3 | 41 | 29 | 0.37 | 0.34 | 22.10 | 40 |
| 34 | 30 | 39.3 | 45 | 43 | 0.18 | 0.31 | 16.11 | 40 |
| 35 | 35 | 39.3 | 46 | 42 | 0.21 | 0.25 | 12.67 | 45 |
| 36 | 35 | 38.7 | 47 | 41 | 0.23 | 0.28 | 15.19 | 45 |
| 37 | 35 | 48.3 | 54 | 45 | 0.25 | 0.29 | 14.99 | 55 |
| 38 | 35 | 36.3 | 50 | 35 | 0.43 | 0.47 | 23.99 | 45 |
| 39 | 30 | 33.3 | 38 | 29 | 0.35 | 0.26 | 12.69 | 40 |
| 40 | 35 | 35.0 | 37 | 41 | 0.48 | 0.23 | 15.00 | 40 |
| 53 | 45 | 50.3 | 56 | 30 | 0.31 | 0.28 | 21.14 | 55 |
| 54 | 45 | 49.7 | 53 | 29 | 0.32 | 0.25 | 11.53 | 55 |

TABLE 2

| Curve Number | Advisory Speed (MPH) POSTED | 10° Ball-Bank Speed (MPH) VEHICLE AVG. | 85th Percentile (MPH) RECORDED | AASHTO Design Speed [f = 0.16] (MPH) CALCULATED | Theorectical Coefficient of Friction $[f]_t$ | g-force (Ft/Sec$^2$) AVERAGE | Lean (°) AVERAGE | BAI Comfort Speed (MPH) |
|---|---|---|---|---|---|---|---|---|
| 41 | None | 31.3 | 32 | 29 | 0.22 | 0.27 | 14.04 | 35 |
| 42 | 30 | 36.7 | 43 | 34 | 0.29 | 0.36 | 15.74 | 45 |
| 43 | 30 | 28.0 | 34 | 34 | 0.16 | 0.34 | 16.06 | 40 |
| 44 | 20 | 23.0 | 27 | 20 | 0.32 | 0.29 | 15.87 | 30 |
| 45 | 20 | 20.7 | 27 | 19 | 0.33 | 0.33 | 18.73 | 20 |

TABLE 2-continued

| Curve Number | Advisory Speed (MPH) POSTED | 10° Ball-Bank Speed (MPH) VEHICLE AVG. | 85th Percentile (MPH) RECORDED | AASHTO Design Speed [f = 0.16] (MPH) CALCULATED | Theorectical Coefficient of Friction [f]$_t$ | g-force (Ft/Sec$^2$) AVERAGE | Lean (°) AVERAGE | BAI Comfort Speed (MPH) |
|---|---|---|---|---|---|---|---|---|
| 46 | 25 | 26.7 | 32 | 27 | 0.24 | 0.34 | 17.55 | 25 |
| 47 | 50 | 51.0 | 60 | 39 | 0.38 | 0.34 | 19.04 | 60 |
| 48 | 45 | 50.0 | 56 | 39 | 0.33 | 0.37 | 16.44 | 55 |
| 49 | 25 | 46.0 | 52 | 60 | 0.11 | 0.23 | 12.23 | 45 |
| 50 | None | 30.0 | 37 | 29 | 0.30 | 0.36 | 17.77 | 35 |
| 51 | 20 | 23.3 | 28 | 21 | 0.31 | 0.35 | 20.80 | 30 |
| 52 | 25 | 53.0 | 49 | 63 | 0.07 | 0.19 | 8.95 | 50 |
| 55 | 40 | 44.3 | 52 | 45 | 0.23 | 0.28 | 14.90 | 55 |
| 56 | 30 | 32.0 | 42 | 35 | 0.28 | 0.37 | 22.03 | 40 |
| 57 | None | 27.0 | 36 | 26 | 0.38 | 0.41 | 24.03 | 30 |
| 58 | 30 | 23.7 | 32 | 24 | 0.34 | 0.39 | 21.53 | 30 |
| 59 | 45 | 49.0 | 55 | 58 | 0.14 | 0.28 | 16.45 | 60 |
| 60 | 25 | 27.7 | 36 | 29 | 0.30 | 0.36 | 21.31 | 35 |
| 61 | 35 | 34.0 | 42 | 33 | 0.31 | 0.31 | 17.46 | 40 |
| 62 | 55 | 60.3 | 61 | 51 | 0.25 | 0.22 | 10.29 | 60 |
| 63 | 20 | 31.7 | 34 | 37 | 0.12 | 0.33 | 16.60 | 35 |
| 64 | 35 | 29.3 | 43 | 33 | 0.32 | 0.33 | 23.04 | 35 |
| 65 | 30 | 33.3 | 38 | 28 | 0.33 | 0.32 | 18.56 | 35 |

The results of Tables 1 and 2 indicate that the advisory speed meter of this invention is a superior instrument for use in obtaining advisory speeds both for horizontal curves in rural roads and for entrance, exit, and connecting ramps between various roadways.

It will be apparent to those skilled in the art that the examples and embodiments described herein are by way of illustration and not of limitation, and that other examples may be used without departing from the spirit and scope of the present invention, as set forth in the appended claims

We claim:

1. An advisory speed meter for determining the maximum lateral horizontal acceleration in a vehicle comprising:
- an accelerometer unit capable of sensing the lateral horizontal acceleration experienced in a vehicle,
- the accelerometer unit mounted on the floor of the vehicle at the vehicle centerline,
- the front of the accelerometer unit oriented toward the front of the vehicle,
- the accelerometer unit mounted perpendicular to the vehicle floor, and
- a meter unit capable of calculating and displaying the maximum lateral horizontal acceleration experienced by the vehicle,
- the accelerometer unit connected by a connector cable to the meter unit.

2. The advisory speed meter of claim 1 wherein the accelerometer unit is mounted to the floor of the vehicle by a pedestal which clamps on a swivel ball mounted on the accelerometer and on a swivel ball mounted on the floor of the vehicle.

3. The advisory speed meter of claim 1 wherein the accelerometer unit further comprises a bubble level for use in mounting the accelerator unit perpendicular to the vehicle floor.

4. The advisory speed meter of claim 1 wherein the meter unit has a visual display of the maximum lateral horizontal acceleration experienced by the vehicle.

5. The advisory speed meter of claim 1 wherein the meter unit further comprises controls for initiating and termination the period for recording the maximum lateral horizontal acceleration experienced by the vehicle.

6. The advisory speed meter of claim 1 wherein the meter unit further comprises controls for calibrating the accelerator unit.

7. The advisory speed meter of claim 1 wherein the meter unit further comprises a control for resetting the meter after a maximum lateral horizontal acceleration has been displayed.

* * * * *